P. A. GAGNON.
AUTOMATIC AIR HOSE COUPLING.
APPLICATION FILED SEPT. 15, 1915.
1,190,639.
Patented July 11, 1916.
2 SHEETS—SHEET 1.
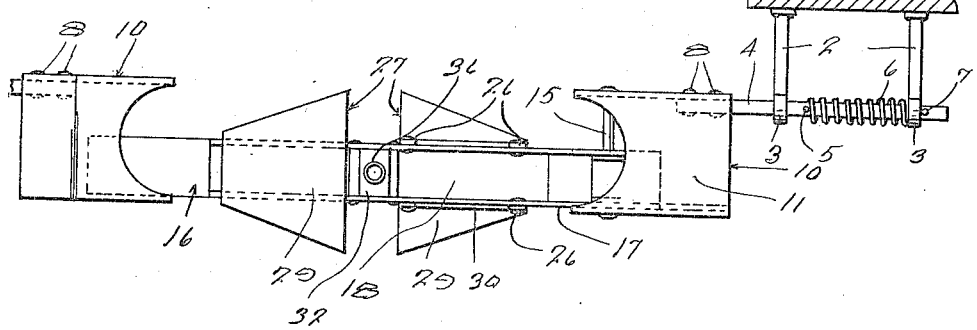
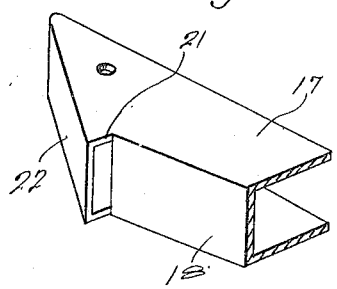
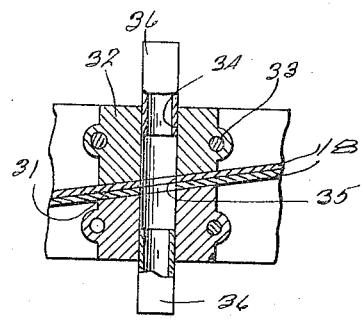
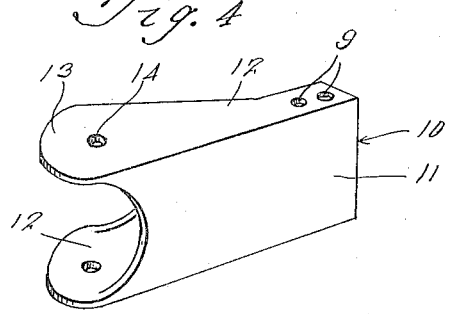
Witness
Inventor
P. A. Gagnon
By
Attorney

UNITED STATES PATENT OFFICE.

PHILIAS A. GAGNON, OF BATHURST, NEW BRUNSWICK, CANADA.

AUTOMATIC AIR-HOSE COUPLING.

1,190,639.  Specification of Letters Patent.  Patented July 11, 1916.

Application filed September 15, 1915. Serial No. 50,860.

*To all whom it may concern:*

Be it known that I, PHILIAS A. GAGNON, subject of the King of Great Britain, residing at Bathurst, in the Province of New Brunswick and Dominion of Canada, have invented certain new and useful Improvements in Automatic Air-Hose Couplings; and I do hereby declare the following to be a full, clear, and exact description of the invention, such as will enable others skilled in the art to which it appertains to make and use the same.

This invention relates to new and useful improvements in automatic air hose couplings and the principal object of the invention is to provide a device which will eliminate the necessity of brakemen and others engaged in the coupling of railway cars handling the ends of the air hose in order to couple the same.

Another object of the invention is to provide an automatic air hose coupler which is so constructed as to remove much of the danger accompanying the coupling of cars and which will render the joint between the ends of the air hose, airtight.

A further object of the invention is to provide a coupler which is attached to the under side of the draw bar and which is so arranged as to automatically couple and be automatically guided into the proper position.

With these and other objects in view, the invention consists in the novel combination and arrangement of parts which will be fully set forth in the following specification and accompanying drawings, in which:—

Figure 2:
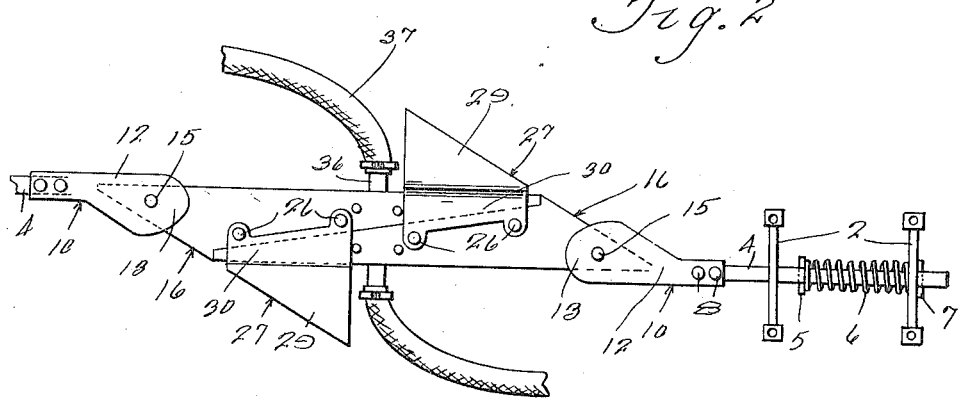
Figure 3:
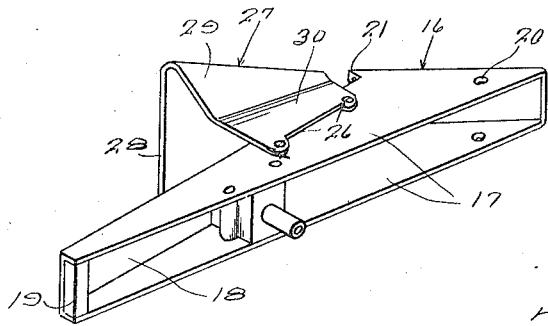
Figure 6:
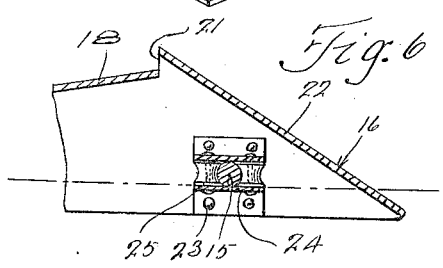
Figure 7:
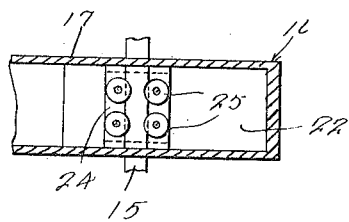

Figure 1 is a side view in elevation of a coupler constructed in accordance with this invention. Fig. 2 is a top plan view of Fig. 1. Fig. 3 is a detail perspective view of one of the couplers showing the same removed from the hangers. Fig. 4 is a detail perspective view of one of the hangers. Fig. 5 is a fragmentary perspective view of the attached end of one of the couplers. Fig. 6 is a fragmentary sectional view of the subject matter illustrated in Fig. 5. Fig. 7 is a sectional view on line 7—7 of Fig. 6, and Fig. 8 is a fragmentary view partly in section through the coupling nozzles.

Referring to the drawings by characters of reference, the numeral 1 designates the draw bar of a car provided with the depending brackets 2. The lower ends of these brackets are provided with the loops 3 which slidably support the bar 4 having extending therethrough the pin 5, the ends of which extend beyond the sides of the bar and form an abutment for the forward end of the compression coil spring 6, the rear end of which abuts the rearmost loop 3 of the rear bracket. A suitable stop pin 7 extends through the bar in the rear of the rearmost loop 3 and limits the forward movement of the bar 4 as clearly shown in Fig. 1.

The coupling support which is best illustrated in Fig. 4 is secured to the forward end of the bar 4 by suitable rivets 8 which extend through the apertures 9 formed in the upper flange of the coupling support and this coupling support is designated generally by the numeral 10 comprising the web 11 having the flanges 12 formed at its edges. The opposite edges of the flanges are connected by a similar web and the upper flange 12 is formed with the apertures 9 through which the rivets 8 extend. The flanges taper toward their forward ends and terminate in the enlarged portion 13 having formed therein a central opening 14 and the opening in the upper flange alines with the opening in the lower flange to receive the pivot pin 15 on which the coupling is supported.

The coupling above referred to is designated generally by the numeral 16 and comprises the tapered parallel bars or flanges 17 which are formed integrally at one edge with the web 18 and the reduced ends of these bars or flanges are connected by a suitable filler block 19. Formed near the opposite ends of these flanges or bars 17 are the apertures 20 which are arranged in alinement and are adapted to receive the pivot pins 15 above referred to. The flanges are formed at the rearmost end on the side which is formed integral with the web 18, with the offset portion 21 forming a shoulder against which the front end of the coöperating coupler abuts. The rearmost beveled faces of these flanges are connected by a suitable web 22 as clearly shown in Figs. 3 and 6. Riveted as at 23 to the flanges 17 are the plates 24 between which are mounted the rollers 25, which engage the pins 15 and this structure forms a carriage for supporting the couplings in place in the coupling support 10 hereinbefore described.

Riveted as at 26 to the flanges 17 on the side on which the offset 21 is formed is the shield or guard 27 comprising the vertically extending plate 28 formed at its upper edges with the downwardly inclined flanges 29 which in turn terminate in the flanges 30 which lie parallel to and against the flanges 17. The plates 28 incline toward the offset portion 21 to form a substantially funnel shaped member for guiding the coöperating coupling to its proper place.

Secured intermediate the ends of the flanges and extending therebetween with its inclined face 31 positioned against the flange 18 is the block 32 which is held in place by the rivets 33 and this block is formed with a central transverse opening 34 registering with the opening 35 in the web 18 into which the end of the pipe 36 extends. This pipe 36 forms a connection for the ends of the air hose designated by the numeral 37 and it will be apparent that the air within the hose will pass through the pipe and into the adjacent coupling.

It will be apparent from the foregoing that in use the couplers are attached to the under sides of the draw bars of the cars and the air hose 37 are connected to the pipe 36. When two adjacent cars are brought together, it will be evident that the tapered ends of the flanges 17 will enter the guides 27 and the flanges 18 of the couplers will lie against each other. In this way it will be seen that the apertures 35 will be brought into alinement, thereby establishing communication between the train pipes on the cars and allowing the air pressure to be established throughout the line. The movement of the carriage consisting of the plates 24 and rollers 25 on the pivot pin 15 will allow the couplers to aline so as to insure the proper coupling of the device regardless of their various positions.

While in the foregoing there has been shown and described the preferred embodiment of this invention, it is to be understood that such changes may be made in the combination and arrangement of parts as will fall within the spirit and scope of the appended claims.

What is claimed is:—

1. In a train pipe coupler, brackets secured to the under side of the draw bar of a car, a rod slidable through the brackets, a spring cushioning the rearward movement of the rod, a supporting member secured to the forward end of the rod, a pivot pin at the forward end of the supporting member, a tapered coupling element provided with an offset at its enlarged end, a tapered extension at the enlarged end of the coupling element, a carriage carried by the tapered extension and slidable on the pivot pin, whereby the device may be moved in a vertical plane and may also swing on the pivot pin, the inclined face of the coupling element being provided with an opening, a train pipe connection alined with the opening and communicating with the train pipe and a funnel shaped guard secured to the enlarged end of the tapered coupling element and extending outwardly from the tapered side thereof, said funnel shaped guard acting as a guide to cause the coöperating element to assume the proper position to couple the train pipe.

2. In a train pipe coupler, brackets secured to the under side of the draw bar of a railway car, a rod slidable in the brackets, a cushioning spring surrounding the rod and adapted to force the same outwardly, a stop to prevent the rod from moving beyond a predetermined distance, a hollow supporting member secured to the forward end of the rod, a pivot pin extending vertically through the supporting member, and a tapered train pipe coupling vertically movable on the pivot pin within the hollow supporting member.

3. In a train pipe coupler, brackets secured to the under side of the draw bar of a railway car, a rod slidable in the brackets, a cushioning spring surrounding the rod and adapted to force the same outwardly, a stop to prevent the rod from moving beyond a predetermined distance, a hollow supporting member secured to the forward end of the rod, a pivot pin extending vertically through the supporting member, a carriage, rollers at opposite ends of the carriage, said rollers engaging the pivot pins and allowing for free vertical movement of the carriage, and a train pipe coupler, supported on the carriage between the upper and lower walls of the supporting member.

In testimony whereof I affix my signature in presence of two witnesses.

PHILIAS A. GAGNON.

Witnesses:
WILLIAM R. JOHNSON,
LEANDER A. PALMER.

Copies of this patent may be obtained for five cents each, by addressing the "Commissioner of Patents, Washington, D. C."